(12) United States Patent
Baecker (10) Patent No.: US 10,882,301 B2
(45) Date of Patent: Jan. 5, 2021

(54) ELECTROPHOTOGRAPHIC ADDITIVE MANUFACTURING WITH MOVING PLATEN AND ENVIRONMENTAL CHAMBER

(71) Applicant: Evolve Additive Solutions, Inc., Minnetonka, MN (US)

(72) Inventor: James Baecker, Chanhassen, MN (US)

(73) Assignee: Evolve Additive Solutions, Inc., Minnetonka, MN (US)

(*) Notice: Subject to any disclaimer, the term of this patent is extended or adjusted under 35 U.S.C. 154(b) by 403 days.

(21) Appl. No.: 15/386,853

(22) Filed: Dec. 21, 2016

(65) Prior Publication Data

US 2017/0192382 A1 Jul. 6, 2017

Related U.S. Application Data

(60) Provisional application No. 62/273,696, filed on Dec. 31, 2015.

(51) Int. Cl.
| | |
|---|---|
| *B33Y 30/00* | (2015.01) |
| *G03G 15/22* | (2006.01) |
| *G03G 15/24* | (2006.01) |
| *G03G 15/00* | (2006.01) |
| *G03G 15/16* | (2006.01) |

(52) U.S. Cl.
CPC .......... *B33Y 30/00* (2014.12); *G03G 15/1625* (2013.01); *G03G 15/224* (2013.01); *G03G 15/24* (2013.01); *G03G 15/6585* (2013.01); *G03G 2215/1695* (2013.01)

(58) Field of Classification Search
CPC .... B33Y 30/00; B33Y 10/00; G03G 15/1625; G03G 15/224; G03G 15/24; G03G 15/6585; B29C 64/40; B29C 64/232; B29C 64/227; B29C 64/245; B29C 64/25; B29C 64/255
USPC ........................................................ 399/361
See application file for complete search history.

(56) References Cited

U.S. PATENT DOCUMENTS

| | | | |
|---|---|---|---|
| 8,123,999 B2 | 2/2012 | Priedeman, Jr. et al. | |
| 8,246,888 B2 | 8/2012 | Hopkins et al. | |
| 8,459,280 B2 | 6/2013 | Swanson et al. | |
| 9,029,058 B2 | 5/2015 | Martin | |
| (Continued) | | | |

*Primary Examiner* — Joseph S Del Sole
*Assistant Examiner* — Jamel M Nelson
(74) *Attorney, Agent, or Firm* — Pauly, DeVries Smith & Deffner LLC (57) ABSTRACT

A method of printing a part in an electrophotographic additive manufacturing system includes printing a part and associated support structure in a layer by layer manner, and providing a chamber in which printing is performed. The chamber is supported by a movable platform and the chamber is positioned about a movable platen. The movable platen is supported by the movable build platform. The movable platen is movable within the chamber on the movable build platform. An electrophotography-based additive manufacturing system for printing a three-dimensional part includes a transfer medium configured to receive and transfer imaged layers of a three-dimensional part, and a support from one or more imaging engines. The system includes a heater configured to heat the imaged layers on the transfer medium to at least a fusion temperature, and a layer transfusion assembly configured to transfuse the imaged layers to the build platen or a previously printed layer.

7 Claims, 7 Drawing Sheets

(56) References Cited

U.S. PATENT DOCUMENTS

| | | | |
|---|---|---|---|
| 2007/0037509 A1* | 2/2007 | Renz | B22F 3/003 454/354 |
| 2008/0169585 A1 | 7/2008 | Zinniel | |
| 2011/0186081 A1 | 8/2011 | Dunn et al. | |
| 2013/0077996 A1 | 3/2013 | Hanson et al. | |
| 2013/0077997 A1 | 3/2013 | Hanson et al. | |
| 2013/0101729 A1* | 4/2013 | Keremes | B23K 26/34 427/8 |
| 2013/0186549 A1 | 7/2013 | Comb et al. | |
| 2013/0186558 A1 | 7/2013 | Comb et al. | |
| 2015/0024169 A1* | 1/2015 | Martin | G03G 15/1625 428/172 |
| 2016/0144564 A1* | 5/2016 | Padgett | B29C 64/106 425/113 |

\* cited by examiner

ELECTROPHOTOGRAPHIC ADDITIVE MANUFACTURING WITH MOVING PLATEN AND ENVIRONMENTAL CHAMBER

CROSS REFERENCE TO RELATED APPLICATION(S)

The present application claims the benefit of U.S. Provisional Patent Application Ser. No. 62/273,696 entitled ELECTROPHOTOGRAPHIC ADDITIVE MANUFACTURING WITH MOVING PLATEN AND ENVIRONMENTAL CHAMBER which was filed on Dec. 31, 2015, the contents of which are incorporated by reference in its entirety.

BACKGROUND

The present disclosure relates to additive manufacturing systems for printing three-dimensional (3D) parts and support structures. In particular, the present disclosure relates to printing 3D parts and sacrificial support structures using an imaging process, such as electrophotography.

Additive manufacturing systems are used to build 3D parts from digital representations of the 3D parts (e.g., AMF and STL format files) using one or more additive manufacturing techniques. Examples of additive manufacturing techniques include extrusion-based techniques, ink jetting, selective laser sintering, powder/binder jetting, electron-beam melting, stereolithographic, and electrophotographic processes. For each of these techniques, the digital representation of the 3D part is initially sliced into multiple horizontal layers. For each sliced layer, a tool path is then generated, which provides instructions for the particular additive manufacturing system to form the given layer.

In an electrophotographic 3D printing or production process, each slice of the digital representation of the 3D part is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

SUMMARY

An aspect of the present disclosure is directed to a method of printing a part in an electrophotography-based additive manufacturing system. The method includes providing a movable build platform and a chamber that is supported by the build platform. The method includes providing a movable platen within the chamber and carried on the movable platform. The platen is movable within the chamber on the build platform such that the imaged layers of part material and support material can be transfused on the build platen or the previously printed layers of the part material and the support material in a layer by layer manner.

Another aspect of the present disclosure is directed to an electrophotography-based additive manufacturing system for printing a three-dimensional part. The additive manufacturing system includes a transfer medium configured to receive and transfer imaged layers of a part material and a support material from one or more imaging engines. The system includes a heater configured to heat the imaged layers on the transfer medium to at least a fusion temperature of the part material and support material. The system includes a layer transfusion assembly that carries a movable build platform, the movable build platform further including a movable platen carried on the movable build platform. A chamber is supported by the movable platform, where the chamber has one or more walls surrounding at least partially surrounding the movable platen. The movable platen is movable within the chamber on the movable build platform.

Another aspect of the present disclosure is directed to an electrophotographic additive manufacturing system that includes a platform and a platen supported by the platform wherein the platen is configured to move relative to the platform. The system includes a chamber supported by the platform where the chamber comprises a plurality of sidewalls that at least partially surround the movable platen. The plurality of sidewalls define an environment wherein the chamber is configured to control a temperature profile within the environment.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" styrene-butyl acrylate-methacrylic acid copolymer is interpreted to include one or more polymer molecules of the copolymer, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one copolymer", "one or more copolymers", and "copolymer(s)" may be used interchangeably and have the same meaning.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

The present disclosure is directed to a method for printing a part with an electro-photographic additive manufacturing system. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

Typical transfusion processes for parts being built using the printing process described above have the material layer being placed onto the part build acting as an interface between a belt or a transfusion roller and a platen. The part as interface therefore carries torsional/shear load between the belt and/or roller and the platen caused by the difference in velocity between the belt and/or roller and the platen. There is a possibility that the belt and/or the roller, which is adjacent to the part, transmits/carries the torsional/shear load. This can cause uncertainties and/or shifts in loading conditions, which in turn can affect part conditions, such as strength and/or quality of the part.

Torsion and shear forces may manifest more readily under certain conditions. For example, layer laydown conditions, such as torsion/shear load and temperature, change depending on whether the part height is greater than or less than about 0.040 inches. Part surface and platen temperatures for an adherent build below about 0.040 inches are approximately 140° C., whereas part surface temperature for an adherent build above about 0.040 inches is approximately 110° C., with platen or bulk temperatures even lower. Control of temperature for part surfaces, bulk parts, and platen in one embodiment may increase the success of a part build operation.

Typical temperature monitoring schemes monitor at fixed locations in the process of a part build, or monitor only at certain times. When a part is being built using a transfusion roller, registration of the top of the part and the transfusion roller has also been difficult to measure. Control of thermal conditions of the part and the platen in one embodiment may increase the success of a part build operation.

In embodiments of the present disclosure, an environmental chamber in the vicinity of the part controls part temperature, which aids in providing a consistent contact surface between the platen and the belt or the roller at the transfusion roller. The environmental chamber also provides better control of shear forces normally incurred by the part surface during a transfusion process. In one embodiment, a platen on which the part is built is movable within an environmental chamber, such that a top of the environmental chamber bears the shear load of transfusion rather than the part layers. In further embodiments, the environmental chamber can have sensor(s) mounted in selected location(s) for continuous process monitoring throughout a build cycle, and can provide a thermally controlled environment that provides local heating and cooling that can be managed at all heights throughout a part build.

Support material suitable for use with the embodiments of the present disclosure are disclosed and discussed in greater detail in commonly owned U.S. Pat. No. 9,029,058, the disclosure of which is incorporated by reference to the extent that it does not conflict with the present disclosure.

The support material functions as sacrificial material for the part material, and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part. Once the 3D part has been printed, the support structure of the sacrificial support material may be removed to reveal the completed 3D part, preferably without damaging any of the critical or delicate geometrical features of the 3D part.

An electrophotography-based additive manufacturing system for printing a three-dimensional part according to an embodiment of the present disclosure comprises a transfer medium configured to receive and transfer imaged layers of a thermoplastic-based powder for a support, and a thermoplastic-based powder for the part from at least two imaging engines; a heater configured to heat the imaged layers on the transfer medium to at least a fusion temperature of the thermoplastic-based powder; and a layer transfusion assembly comprising a build platform, the layer transfusion assembly being configured to transfuse the heated layers in a layer-by-layer manner onto the build platform to print the three-dimensional part. One or more imaging engines comprise in one embodiment a first imaging engine configured to print layers of part material, and a second imaging engine configured to print layers of support material different than the part material.

Figure 1:
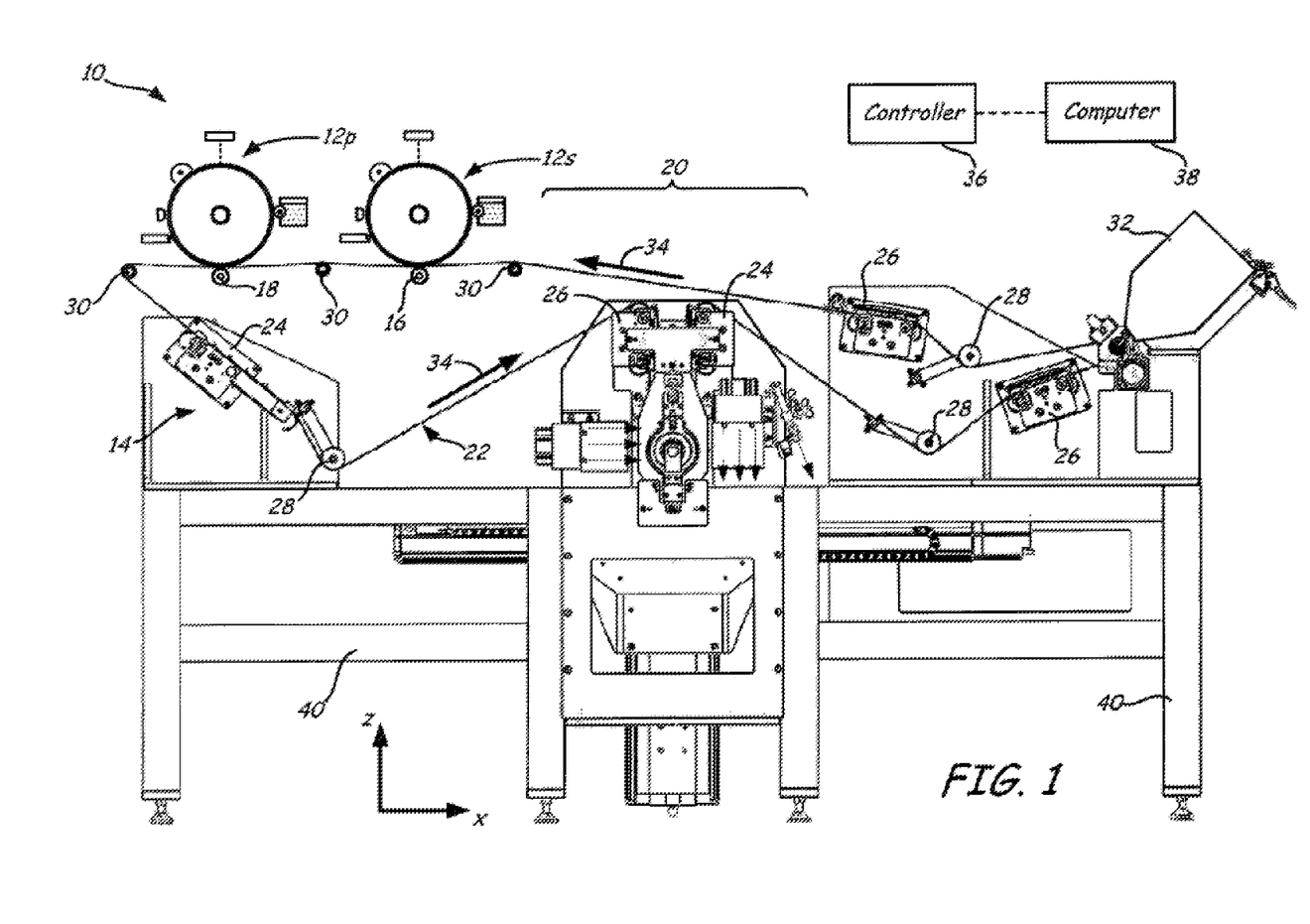
FIG. 1 is a front view of an example electrophotography-based additive manufacturing system for printing 3D parts, support structures, and boundaries from part, support, and boundary materials of the present disclosure.

FIGS. 1-4 illustrate system 10, which is an exemplary electrophotography-based additive manufacturing system for printing 3D parts from a part material, such as but not limited to an ABS part material, and associated support structures from the support material of the present disclosure. As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. Patent Publication Nos. 2013/0186549 and 2013/0186558.

EP engines 12p and 12s are imaging engines for respectively imaging or otherwise developing layers of the part and support materials, where the part and support materials are each preferably engineered for use with the particular architecture of EP engine 12p or 12s. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

In some embodiments, the system 10 includes a controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide 3D part printing instructions (and other operating information). For example, the host computer 38 may transfer information to the controller 36 that relates to the sliced layers of the 3D parts and support structures, thereby allowing the system 10 to produce the 3D parts and support structures in a layer-by-layer manner.

The components of system 10 may be retained by one or more frame structures, such as system frame 40. Additionally, the components of system 10 are preferably retained within an enclosable housing (not shown) that prevents ambient light from being transmitted to the components of system 10 during operation.

FIG. 1 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be varied such that the EP engines are in a different order relative to the rotational direction of belt 22. In further alternative embodiments, system 10 may include three or more EP engines for printing layers of additional materials.

Figure 2:
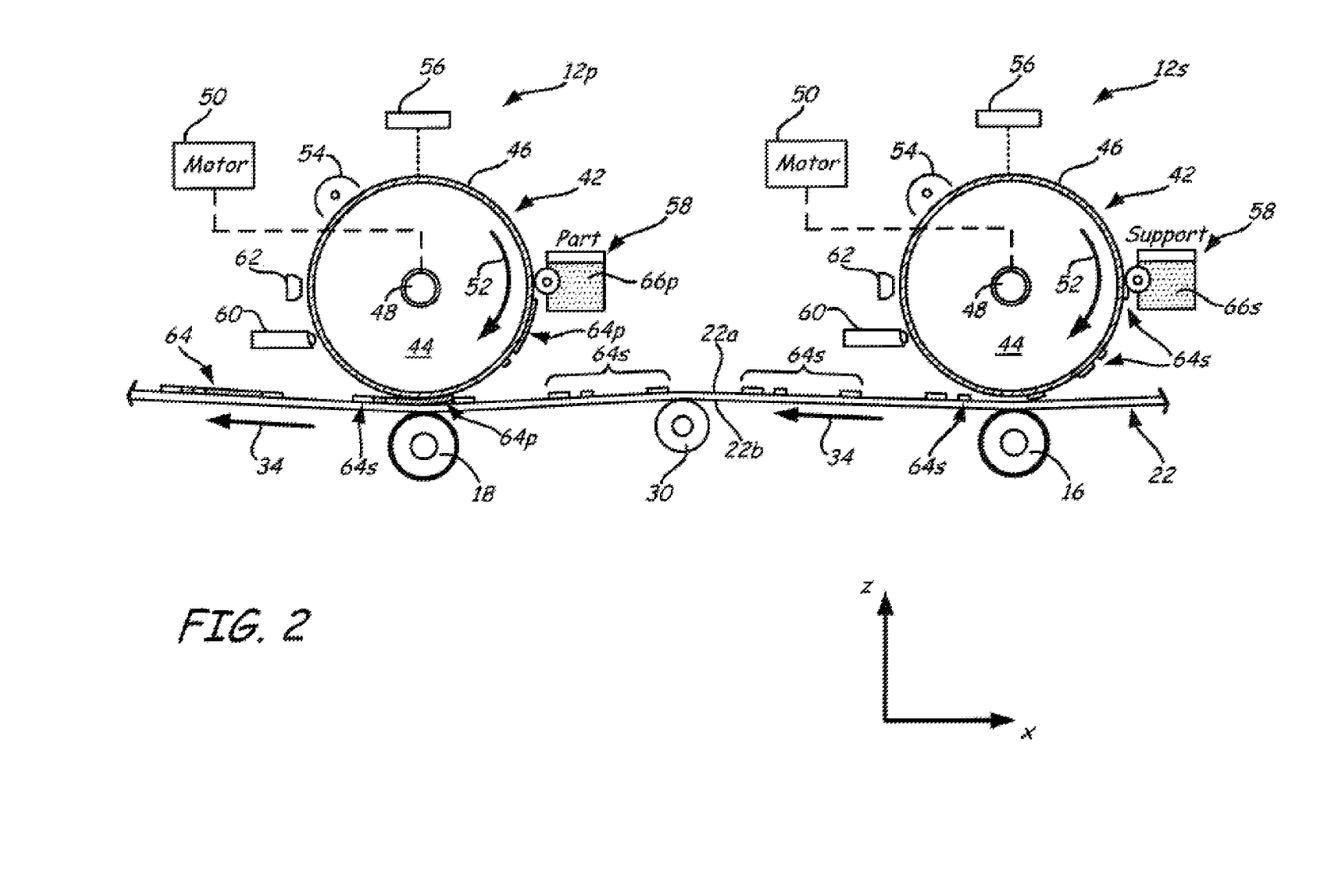
FIG. 2 is a schematic front view of two electrophotography engines of the system for developing layers of the part, support, and boundary materials.
Figure 3:
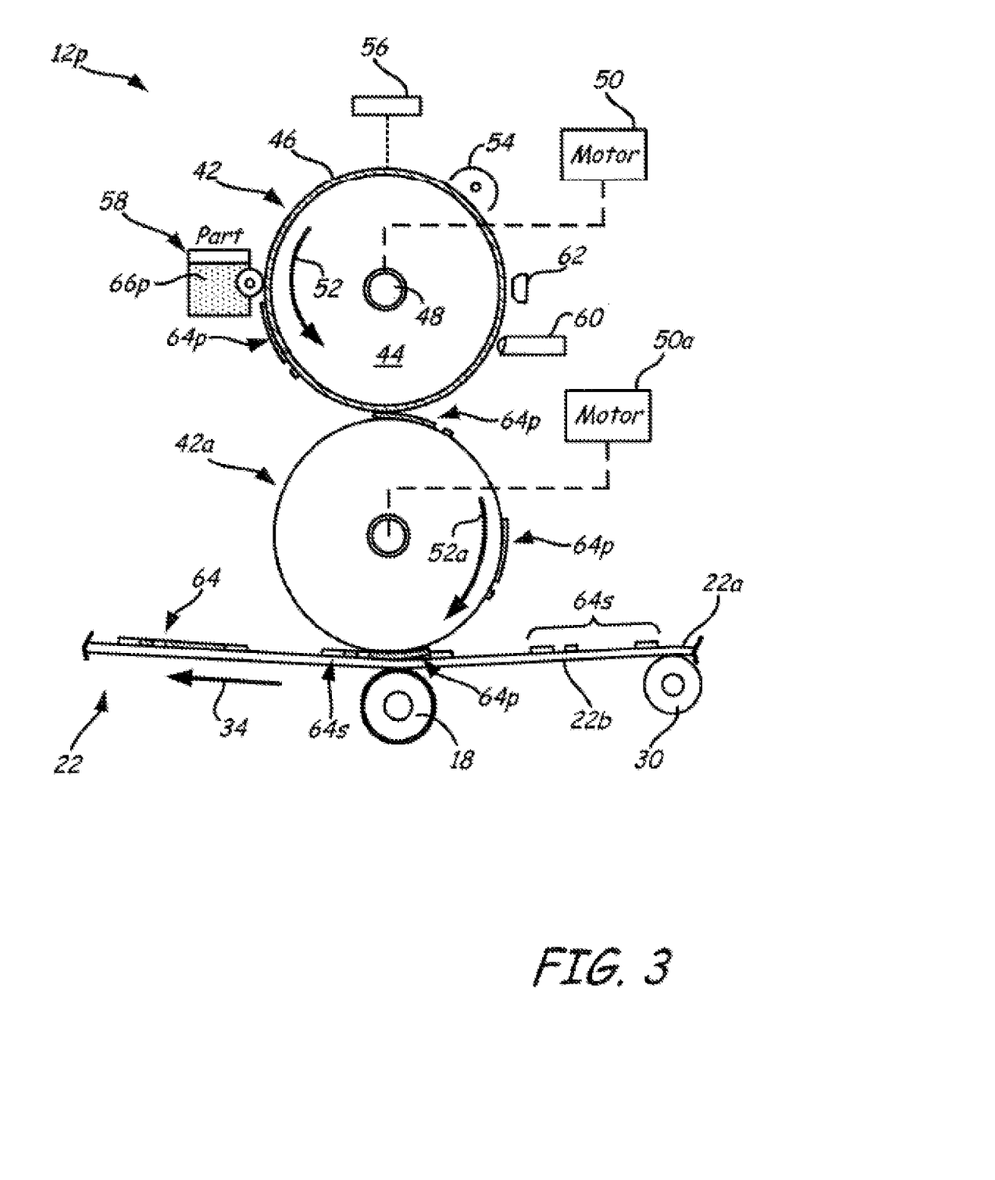
FIG. 3 is a schematic front view of an alternative electrophotography engine, which includes an intermediary drum or belt.
Figure 4:
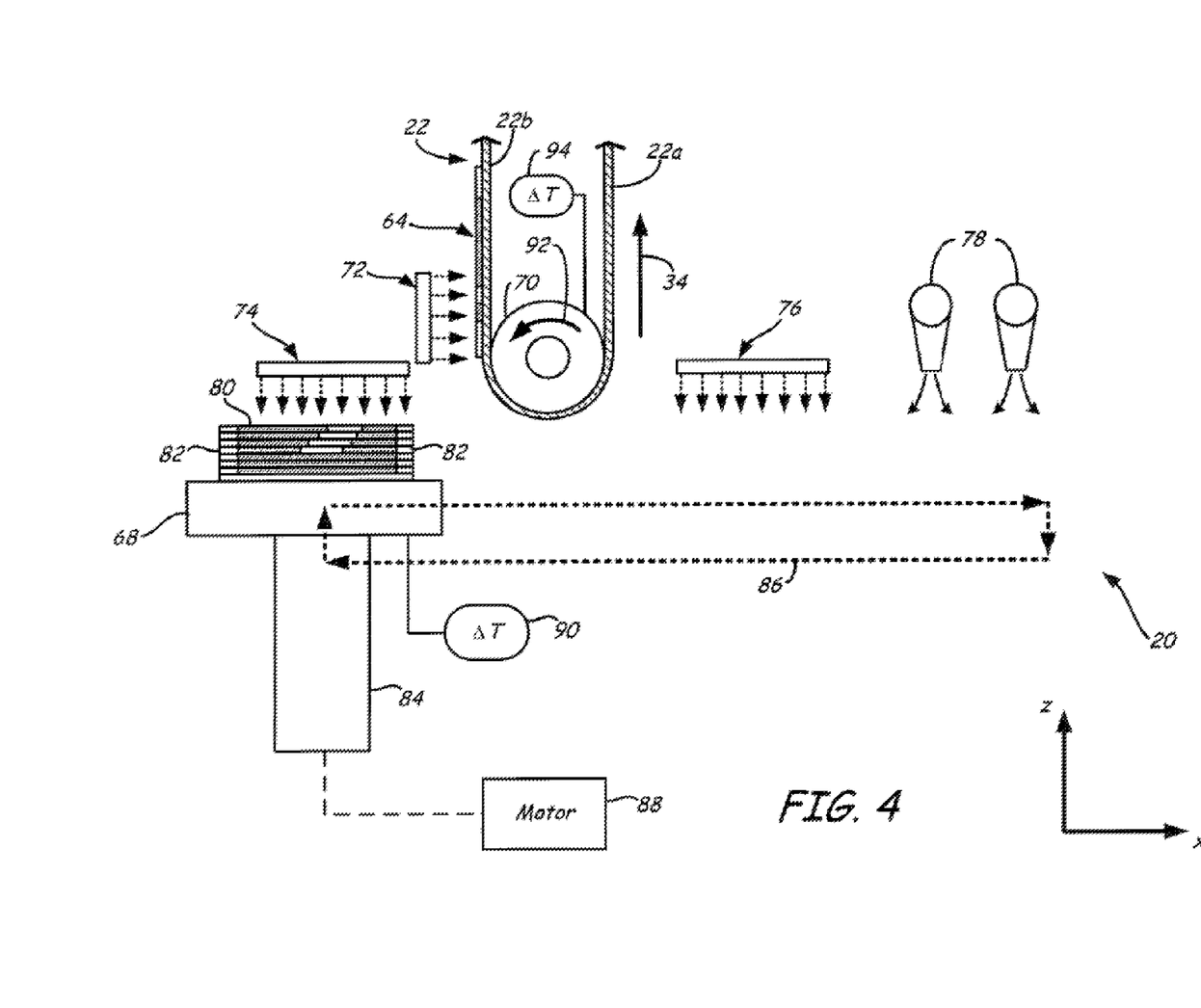
FIG. 4 is a schematic front view of a layer transfusion assembly of the system for performing layer transfusion steps with the developed layers where the layers are shown in a section view.

In FIGS. 2, 3, and 4, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material of the present disclosure to the charged or discharged image areas, thereby creating the layers of the 3D part or support structure.

As further shown, EP engines 12p and 12s also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude, as discussed below.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized). This creates successive layers 64p or 64s as photoconductor drum 12 continues to rotate in the direction of arrow 52, where the successive layers 64p or 64s correspond to the successive sliced layers of the digital representation of the 3D part or support structure.

The successive layers 64p or 64s are then rotated with surface 46 in the direction of arrow 52 to a transfer region in which layers 64p or 64s are successively transferred from photoconductor drum 42 to belt 22, as discussed below. While illustrated as a direct engagement between photoconductor drum 42 and belt 22, in some preferred embodiments, EP engines 12p, 12s, and 12p may also include intermediary transfer drums and/or belts, as discussed further below.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 16. Examples of suitable transfer belts for belt 22 include those disclosed in Comb et al., U.S. Patent Application Publication Nos. 2013/0186549 and 2013/0186558. Belt 22 includes front surface 22a and rear surface 22b, where front surface 22a faces surfaces 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller 36 preferably rotates photoconductor drums 36 of EP engines 12p and 12s at the same rotational rates that are synchronized with the line speed of belt 22 and/or with any intermediary transfer drums or belts. This allows system 10 to develop and transfer layers 64p and 64s in coordination with each other from separate developer images. In particular, as shown, each part layer 64p may be transferred to belt 22 with proper registration with each support layer 64s to preferably produce a combined part and support material layer 64sp, and each part and support material layer 64sp may be transferred to belt 22 with proper registration with each boundary layer 64 to preferably produce a combined part and support material layer 64. This allows layers 64p and 64s to be transfused together, requiring the part, support, and boundary materials to have thermal properties and melt rheologies that are similar or substantially the same (as discussed in issued U.S. Pat. No. 9,029,058). As can be appreciated, some layers transferred to layer transfusion assembly 20 may only include support material 66s or may only include part material 66p, depending on the particular support structure and 3D part geometries and layer slicing.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part, support structure, and boundary.

In some preferred embodiments, one or more of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired. While two EP engines are illustrated and described herein, the present disclosure is not limited to a system having two EP engines. Rather, the present disclosure can be used with an EP system that has one or more EP engines.

FIG. 4 illustrates an exemplary embodiment for layer transfusion assembly 20. As shown, layer transfusion assembly 20 includes build platform 68, nip roller 70, heaters 72 and 74, post-fuse heater 76, and air jets 78 (or other cooling units). FIG. 4 is shown in side elevation, except for the layer 64 and the part and support on build platform 68, which are shown in section view. Build platform 68 is a platform assembly or platen of system 10 that is configured to receive the heated combined layers 64 (or separate layers 64p and 64s) for printing a 3D part and support structure, referred to as 3D part 80 and support structure 82, in a layer-by-layer manner. In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, and the like).

Build platform 68 is supported by gantry 84, which is a gantry mechanism configured to move build platform 68 along the z-axis and the x-axis to produce a reciprocating rectangular pattern, where the primary motion is back-and-forth along the x-axis (illustrated by broken lines 86). Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a desired average part temperature of 3D part 80 and/or support structure 82, as discussed in Comb et al., U.S. Patent Application Publication Nos. 2013/0186549 and 2013/0186558. This allows build platform 68 to assist in maintaining 3D part 80 and/or support structure 82 at this average part temperature.

Nip roller 70 is an exemplary heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a desired transfer temperature for layers 64.

Heater 72 is one or more heating devices (e.g., an infrared heater and/or a heated air jet) configured to heat layers 64 to a temperature near an intended transfer temperature of the part, support, and boundary materials, such as at least a fusion temperature of the part, support, and boundary materials, preferably prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80 and/or support structure 82 to an elevated temperature, such as at the same transfer temperature as the heated layers 64 (or other suitable elevated temperature).

As mentioned above, the support material 66s used to print support structure 82 is selected in one embodiment to be compatible with the properties and rheology of the part material 66p used to print 3D part 80, such as, for example, thermal properties, elasticity, and melt rheology. This allows part and support materials of layers 64p and 64s to be heated together with heater 74 to substantially the same transfer temperature, and also allows the part and support materials at the top surfaces of 3D part 80 and support structure 82 to be heated together with heater 74 to substantially the same temperature. Thus, the part layers 64p and the support layers 64s may be transfused together to the top surfaces of 3D part 80 and support structure 82 in a single transfusion step as combined layer 64. This single transfusion step for transfusing the combined layer 64 is not believed to be feasible without matching the thermal properties and the melt rheologies of the part and support materials. In another embodiment, since the bulk properties of partially formed parts are more elastic that flowable, temperature dependent elasticities of the part and support materials may also be matched.

Post-fuse heater 76 is located downstream from nip roller 70 and upstream from air jets 78, and is configured to heat the transfused layers to an elevated temperature in the post-fuse or heat-setting step. Again, the similar thermal properties and melt rheologies of the part, support, and boundary materials allow post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the close melt rheologies of the part and support materials). In comparison, nip roller 70 may be heated to a desired transfer temperature for layers 64 (also due to the similar thermal properties and melt rheologies of the part and support materials).

During the printing operation, belt 22 carries a layer 64 past heater 72, which may heat the layer 64 and the associated region of belt 22 to the transfer temperature. Suitable transfer temperatures for the part and support materials include temperatures that exceed the glass transition temperatures of the part and support materials, which are preferably similar or substantially the same, and where the part and support materials of layer 64 are softened but not melted (e.g., a temperature of ranging from about 140° C. to about 180° C. for an ABS part material).

As further shown in FIG. 4, during operation, gantry 84 may move build platform 68 (with 3D part 80 and support structure 82) in a reciprocating rectangular pattern 86. In particular, gantry 84 may move build platform 68 along the x-axis below, along, or through heater 74. Heater 74 heats the top surfaces of 3D part 80 and support structure 82 to an elevated temperature, such as the transfer temperatures of the part and support materials. As discussed in Comb et al., U.S. Patent Application Publication Nos. 2013/0186549 and 2013/0186558, heaters 72 and 74 may heat layers 64 and the top surfaces of 3D part 80 and support structure 82 to about the same temperatures to provide a consistent transfusion interface temperature. Alternatively, heaters 72 and 74 may heat layers 64 and the top surfaces of 3D part 80 and support structure 82 to different temperatures to attain a desired transfusion interface temperature.

The continued rotation of belt 22 and the movement of build platform 68 align the heated layer 64 with the heated top surfaces of 3D part 80 and support structure 82 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22*b* of belt 22 to rotate around nip roller 70 to nip belt 22 and the heated layer 64 against the top surfaces of 3D part 80 and support structure 82. This presses the heated layer 64 between the heated top surfaces of 3D part 80 and support structure 82 at the location of nip roller 70, which at least partially transfuses heated layer 64 to the top layers of 3D part 80 and support structure 82.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80 and support structure 82. Maintaining the transfusion interface temperature at a transfer temperature that is higher than the glass transition temperatures of the part and support materials, but lower than their fusion temperatures, allows the heated layer 64 to be hot enough to adhere to 3D part 80 and support structure 82, while also being cool enough to readily release from belt 22. Additionally, as discussed above, the similar thermal properties and melt rheologies of the part and support materials allow them to be transfused in the same step.

After release, gantry 84 continues to move build platform 68 along the x-axis to post-fuse heater 76. At post-fuse heater 76, the top-most layers of 3D part 80 and support structure 82 (including the transfused layer 64) may then be heated to at least the fusion temperature of the part and support materials in a post-fuse or heat-setting step. The part and support materials of the transfused layer 64 are heated to a highly fusible state such that polymer molecules of the transfused layer 64 quickly inter-diffuse to achieve a high level of interfacial entanglement with 3D part 80 and support structure 82.

Additionally, as gantry 84 continues to move build platform 68 along the x-axis past post-fuse heater 76 to air jets 78, air jets 78 blow cooling air towards the top layers of 3D part 80 and support structure 82. This actively cools the transfused layer 64 down to the average part temperature, as discussed in Comb et al., U.S. Patent Application Publication Nos. 2013/0186549 and 2013/0186558.

To assist in keeping 3D part 80 and support structure 82 at the average part temperature, in some preferred embodiments, heater 74 and/or post-heater 76 may operate to heat only the top-most layers of 3D part 80 and support structure 82. For example, in embodiments in which heaters 72, 74, and 76 are configured to emit infrared radiation, 3D part 80 and support structure 82 may include heat absorbers and/or other colorants configured to restrict penetration of the infrared wavelengths to within the top-most layers. Alternatively, heaters 72, 74, and 76 may be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82 upward for proper registration with the next layer 64. The same process may then be repeated for each remaining layer 64 of 3D part 80 and support structure 82.

In some preferred embodiments, a resulting 3D part 80 is encased laterally (i.e., horizontally to the build plane) in the support structure 82, such as shown in FIG. 4. This is believed to provide good dimensional integrity and surface quality for the 3D part 80 while using a reciprocating build platen 68 and a nip roller 70.

After the printing operation is completed, the resulting 3D part 80 and support structure 82 may be removed from system 10 and undergo one or more post-printing operations. For example, support structure 82 may be sacrificially removed from 3D part 80, such as by using an aqueous-based solution (e.g., an aqueous alkali solution). Under this preferred technique, support structure 82 may at least partially dissolve in the solution, separating it from 3D part 80 in a hands-free manner.

In comparison, part materials such as an ABS part material are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

Collectively (prior to removal of the support structure), the 3D part (e.g., 3D part 80) printed from the ABS part material and the support structure (e.g., support structure 82) printed from the support material of the present disclosure may be provided as an "object" where the 3D part and support structure are adhered to each other. Prior to removal of the support structure from the 3D part, the support structure may support overhanging features of the 3D part, significant angular slopes exist in the 3D part, areas where it is essential to also preserve delicate features in the 3D part, such as small orifices or controlled pore structures, and in some situations, to laterally encase the 3D part.

Figure 5A:
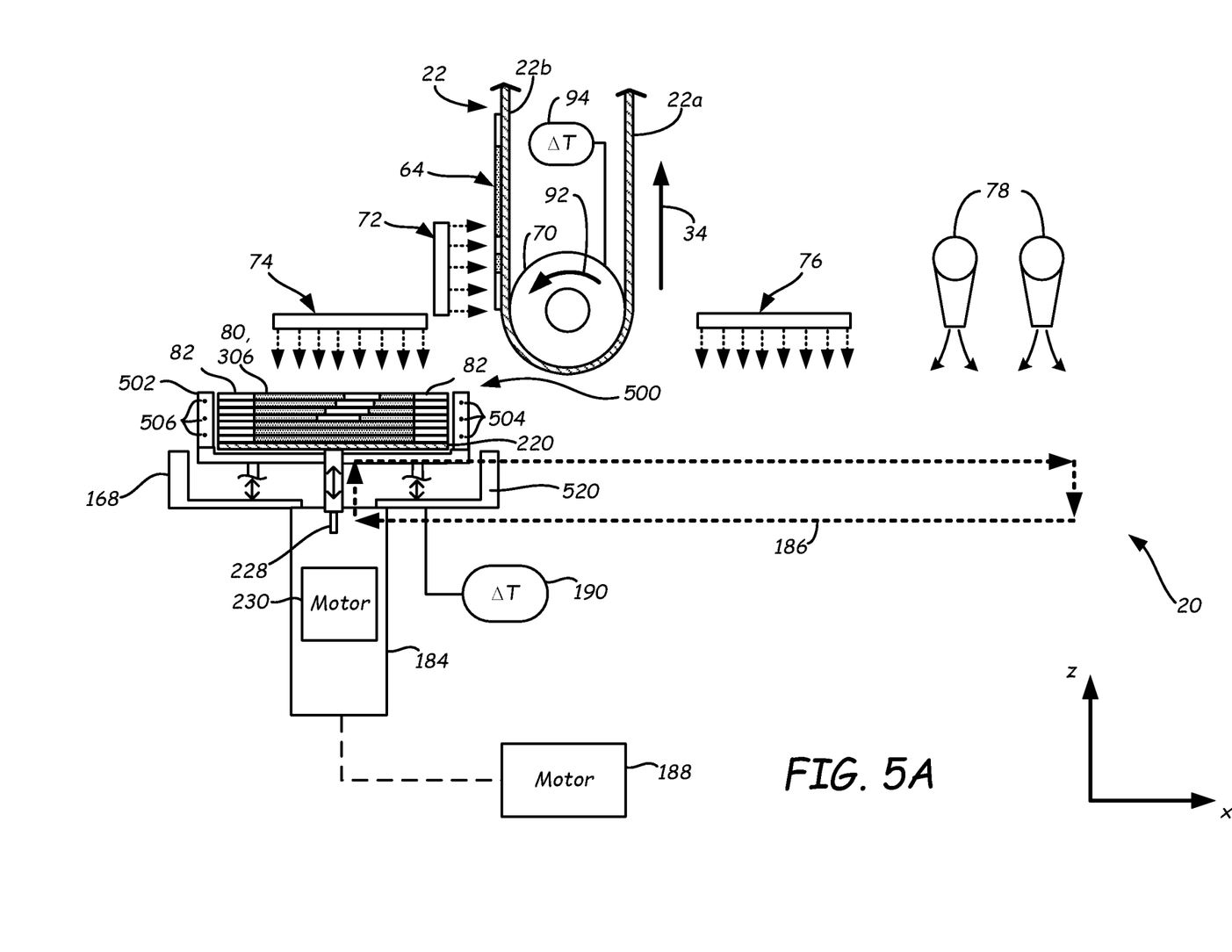
FIG. 5A is a schematic front view of a layer transfusion assembly of a system for performing layer transfusion steps with an environmental chamber surrounding the developed layers where the layers are shown in a section view.

Referring to FIG. 5A, another embodiment includes a build platform 168 that is movable along a pattern 186. Build platform 168 is supported by gantry 184 configured to move build platform 168 along the z-axis and the x-axis to produce a reciprocating rectangular pattern, where the primary motion is back-and-forth along the x-axis (illustrated by broken lines 186). Gantry 184 may be operated by motor 188 based on commands from controller 36, where motor 188 may be an electrical motor, a hydraulic system, a pneumatic system, or the like. In this embodiment, build platform 168 has an opening 200 in a top surface 202 that is recessed into a body 204 of the build platform 168.

Opening 200 is sized to receive a movable platen 220 on which a three-dimensional part 80 with support material 82 is built. The platen 220 is movable in a z-direction from a home position to a printing position, shown in FIGS. 6 and 7 respectively. In the home position as shown in section in FIG. 6, the platen 220 rests in the opening 200 and its top 222 is even with the top 202 of build platform 168. This position, along with an environmental chamber 500 (described below) and movable using actuators 240, allows for printing a part with a height of up to height 224 of the environmental chamber 500 with full lateral support of the layers of the part that are already printed. In some embodiments the actuators 240 that move the environmental chamber 500 may be optional. Therefore, in some embodiments the build chamber 500 is non-movably retained relative to the build platform 168.

Build platform 168 is movable in the X and Z directions to match a speed of the belt 22 and to allow for nip roller operation in transfusion. Movable part platen 220 is movable in Z with respect to the build platform 168. A three-dimensional part is built on the movable part platen 220, where the movable part platen is moved up and down for transfusion of layers.

In one embodiment, platen 220 is coupled to a support 226 which is coupled to a motor 230 through an actuator 228. Platen 220, support 226, actuator 228, and motor 230 are in one embodiment carried by the build platform 168, and therefore move with the motion of the build platform 168.

As further illustrated in FIG. 5A, an environmental chamber 500 is shown. Environmental chamber 500 in one embodiment is defined by a wall 502 that may fully or partially surround the platen 220. In some embodiments, the wall 502 may be movable in a Z direction independently of the movable platen 220. Movement of the movable platen 220 is in one embodiment performed within the environmental chamber 500. The environmental chamber 500 provides multiple potential advantages, including lateral support for the part that is being built, as well as more strict environmental control of conditions such as temperature. Further, the movable environmental chamber 500 can be used to accept shear loading of a roller such as a nip roller during layer transfusion, allowing the previously printed layers to maintain a greater degree of stability and reduction of potentially deforming forces. Still further, since control of the environment is important, as small variations in temperature can cause problems such as improper cooling or formation of three-dimensional parts, the movable environmental chamber 500 provides in one embodiment temperature modifying element(s) such as a heater or heaters 504 (and/or cooler or coolers) within the walls thereof, for local heating and cooling of a three-dimensional part within the environmental chamber 500. In some embodiments the heater or heaters 504 (and/or cooler or coolers) are multi-zone heater such that a temperature profile within the chamber 500 can be controlled. The heaters 504 in the walls of the environmental chamber 500 may be individually or collectively controlled. Local heating and cooling can therefore be managed at all heights throughout a part build.

In yet another embodiment, the walls of the environmental chamber 500 provide a mounting location for sensors 506 such as temperature sensors and/or position sensors that are configured to sense a height of the platen 220 and or the chamber 500 relative to the platform 168. Also, the environmental chamber can have heated or cooled walls that can be individually or collectively controlled. As illustrated, the walls 502 form a continuous perimeter. However, it is within the scope of the present disclosure for the walls to partially enclose the build environment within the chamber 500.

Figure 5B:
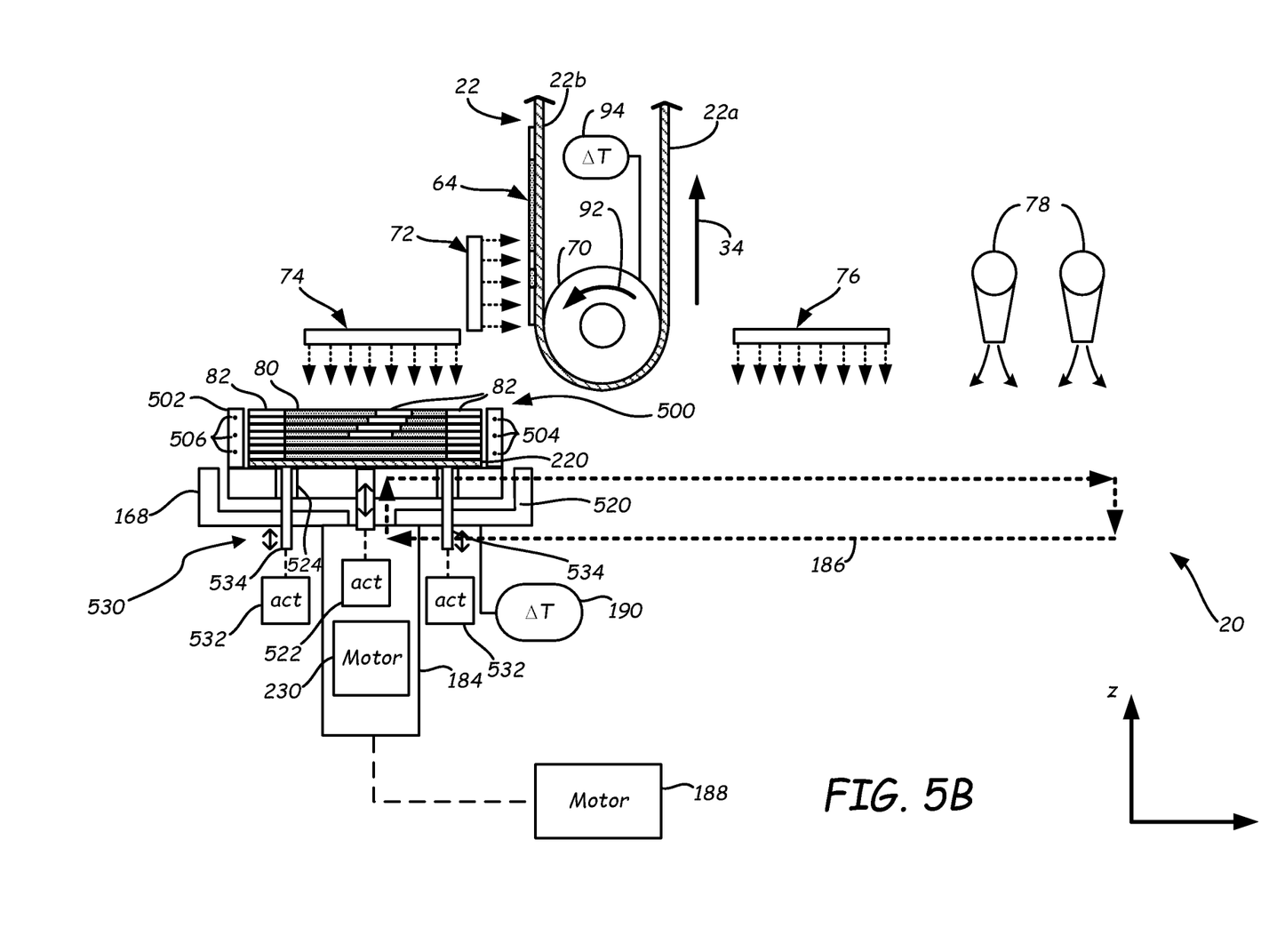
FIG. 5B is a schematic front view of another layer transfusion assembly of a system for performing layer transfusion steps with an environmental chamber surrounding the developed layers where the layers are shown in a section view.
Figure 5C:
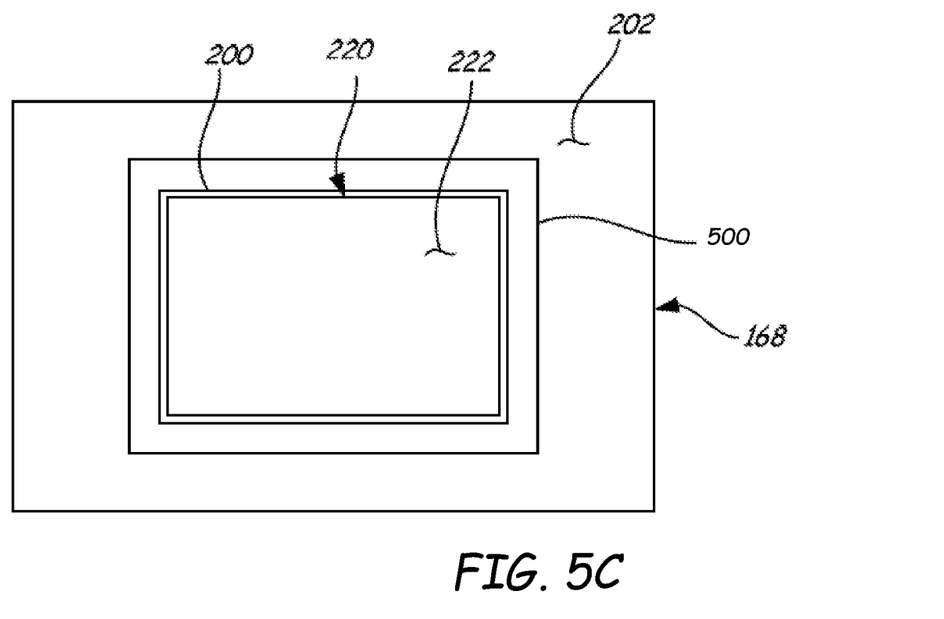
FIG. 5C is a schematic top view of the build platform of FIGS. 5A and 5B.

As further illustrated in FIGS. 5B and 5C, another embodiment providing relative movement between a movable platen 530 carrying a part being built and the environmental chamber 500 comprises the environmental chamber movable on a movable base 520, and a platen 530 separately movable using separate actuators 532. In this embodiment, the environmental chamber 500 moves in the X direction with the build platform 168, and in the Z direction on the movable platform 520, which moves as described above. The part sits on a second movable platen 530 in the environmental chamber 500, wherein the movable platen 530 is separately movable with respect to the environmental chamber 500. In one embodiment, this is done using a plurality of legs 534 attached to the platen 530 and extending downward through openings 524 in the environmental chamber 500, the legs 534 coupled to actuators 532 that cause movement of the second movable platen 530 within the environmental chamber 500.

Figure 6:
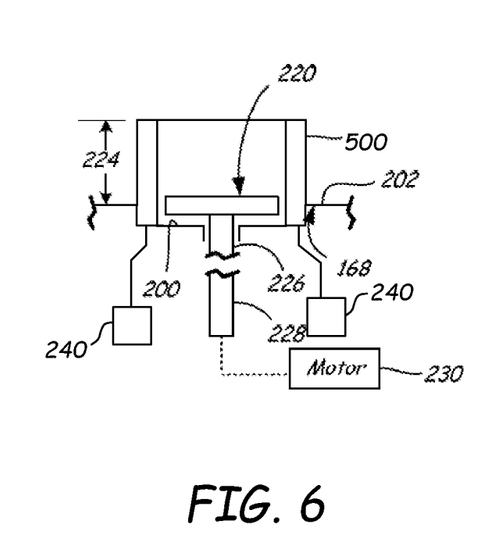
FIG. 6 is a partial side elevation view of a movable platen and environmental chamber in a home position according to an embodiment of the present disclosure.
Figure 7:
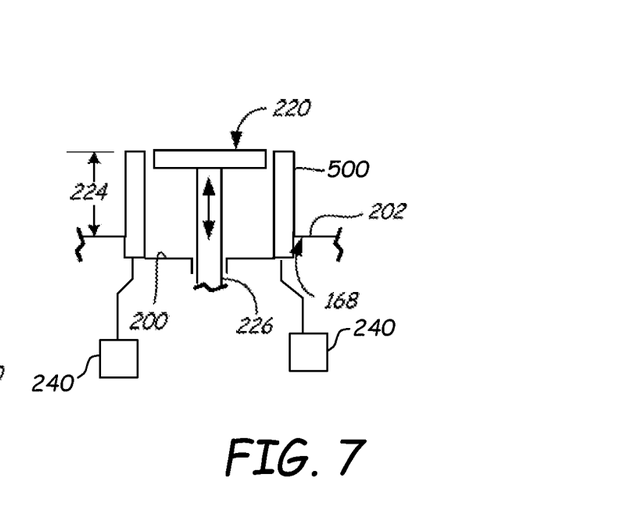
FIG. 7 is a partial side elevation view of the movable platen and environmental chamber of FIG. 6 in a printing position.

To print a layer of a three-dimensional part, and support material, using the platen 220 and environmental chamber, the platen 220 is raised to its initial printing position, in one embodiment a height substantially equal to the height 224 of the environmental chamber 500, or slightly higher. A layer of part material and support material are transferred to a transfer medium such as transfer belt 22 as described herein. The build platform 168, platen 220, and environmental chamber 500 are moved into printing position, and a nip roller such as nip roller 70 is used to transfuse the layer of part material and support material to the platen 220. As subsequent layers are added to the part on platen 220, the position of platen 220 and environmental chamber 500 is adjusted by adjusting the relative positions of the platen 220 and environmental chamber 500, such as by lowering the platen 220, raising the environmental chamber 500, or a combination thereof, a distance corresponding to a thickness of a layer to allow the environmental chamber 500 to provide lateral support for the printed layers as additional layers are added to the three-dimensional part. The environmental chamber 500 constrains the part and support material against lateral deformation during printing.

A build platform such as build platform 168 may include more than one movable platen and environmental chamber combination as described herein, allowing for the printing of multiple parts in layers, with the support material and part material being transferred to the transfer belt and transfused at the appropriate platen 220. Further, while the boundary is shown as rectangular, a boundary of any shape may be used without departing from the scope of the disclosure. Further, the height 224 of the boundary is shown as an example, and a boundary height 224 is limited only by physical characteristics of the build platform 168 and three-dimensional printer. For example, the recess 200 may be deeper or shallower than that shown, and may allow for an increased part height by moving further into the build platform, or in some embodiments, through the build platform to boundary walls extending beneath the build platform, to provide lateral constraint for a larger part. Further, the boundary and/or platen 220 may be supplied with heating and/or cooling options to allow greater control of the temperature of the part.

A method of printing a part in an electrophotography-based additive manufacturing system includes printing a support structure for the part, and printing the part on the support structure. Printing is performed in one embodiment in a chamber that may optionally be movable relative to the build platform where the chamber is positioned about a movable platen that is carried on a movable build platform. The movable platen is movable within the chamber and provides a boundary surrounding the support and the part while controlling environmental conditions within the chamber. Providing the movable chamber comprises in one embodiment providing a chamber having walls surrounding the movable platen carried on the movable build platform, the movable platen movable within the movable chamber on the movable build platform.

Although the present disclosure has been described with reference to preferred embodiments, workers skilled in the art will recognize that changes may be made in form and detail without departing from the spirit and scope of the disclosure.

The invention claimed is:

1. An electrophotography-based additive manufacturing system for printing a three-dimensional part, the additive manufacturing system comprising:
   a transfer medium configured to receive and transfer imaged layers of a thermoplastic-based powder for a three-dimensional part, and a thermoplastic-based powder for a soluble support from one or more imaging engines;
   a heater configured to heat the imaged layers on the transfer medium to at least a fusion temperature of the thermoplastic-based powder; and
   a layer transfusion assembly comprising:
      a movable build platform;
      a movable platen carried on the movable build platform and configured to accept imaged layers from the transfer medium using heat and pressure over time; and
      a chamber supported by the build platform, the chamber having one or more walls at least partially surrounding the movable platen and an opening in a top of the chamber, the movable platen movable vertically within the chamber on the movable build platform and the walls movable vertically independent of the movable platen.

2. The additive manufacturing system of claim 1, wherein the chamber further comprises at least one chamber heater.

3. The additive manufacturing system of claim 1, wherein the chamber comprises a plurality of walls surrounding the movable platen carried on the movable build platform.

4. The additive manufacturing system of claim 3, and further comprising a chamber heater for each of the plurality of walls of the chamber.

5. The additive manufacturing system of claim 3, wherein each wall of the plurality of walls of the chamber includes at least one chamber heater, wherein at least one of the chamber heaters comprises a multi-zone heater.

6. The additive manufacturing system of claim 1, and further comprising at least one temperature sensor, the at least one temperature sensor mounted to a wall of the chamber.

7. The additive manufacturing system of claim 1, and further comprising at least one position sensor, the at least one position sensor mounted to the one or more walls of the chamber and configured to sense a position of the platen within the chamber.

* * * * *